(12) United States Patent
Steele (10) Patent No.: US 7,815,837 B2
(45) Date of Patent: *Oct. 19, 2010

(54) METHOD FOR COMPRESSION MOLDING PLASTIC ARTICLES

(75) Inventor: Scott W. Steele, Perrysburg, OH (US)

(73) Assignee: Graham Packaging Company, L.P., York, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/186,343

(22) Filed: Aug. 5, 2008

(65) Prior Publication Data

US 2008/0290558 A1 Nov. 27, 2008

Related U.S. Application Data

(62) Division of application No. 11/185,976, filed on Jul. 21, 2005, now Pat. No. 7,407,376.

(51) Int. Cl.
*B28B 5/08* (2006.01)

(52) U.S. Cl. .................. 264/297.6; 425/348 S; 425/259; 425/261; 425/353; 425/348 R (58) Field of Classification Search .............. 264/297.6; 425/348, 259, 261, 353, 348 R, 348 S
See application file for complete search history.

(56) References Cited

U.S. PATENT DOCUMENTS

| | | | |
|---|---|---|---|
| 2,973,555 A * | 3/1961 | Schwepke | 425/215 |
| 3,635,612 A | 1/1972 | Fortin et al. | |
| 4,640,673 A | 2/1987 | Takeda et al. | |
| 5,071,339 A | 12/1991 | Murayama et al. | |
| 5,118,273 A | 6/1992 | Murayama et al. | |
| 5,603,964 A | 2/1997 | Rote et al. | |
| 5,807,592 A | 9/1998 | Alieri | |
| 5,811,044 A | 9/1998 | Rote et al. | |
| 5,866,177 A | 2/1999 | Ingram | |
| 6,042,754 A | 3/2000 | Yang et al. | |

(Continued)

FOREIGN PATENT DOCUMENTS

WO  03/047834  6/2003

(Continued)

*Primary Examiner*—Khanh Nguyen
*Assistant Examiner*—Margaret Squalls
(74) *Attorney, Agent, or Firm*—Stradley Ronon Stevens & Young, LLP (57) ABSTRACT

Method for compression molding plastic articles. The method includes the step of providing a plurality of molds mounted for travel around a first axis. Each mold includes upper and lower mold sections, with at least one of the mold sections being moveable in a non-circular first endless path, and being moveable with respect to the other mold section to form a mold cavity. A mold charge delivery system is provided to deliver individual mold charges to the mold cavities and includes at least one delivery mechanism that travels in a second endless path around a second axis spaced from the first axis, wherein the second endless path overlies a portion of the first endless path. At least one of the mold sections is moved radially relative to the first axis during at least a portion of the first endless path wherein the second endless path overlies the first endless path.

20 Claims, 5 Drawing Sheets

U.S. PATENT DOCUMENTS

| | | |
|---|---|---|
| 6,074,583 A | 6/2000 | Ingram |
| 6,299,428 B1 | 10/2001 | Ingram |
| 6,478,568 B2 * | 11/2002 | Ingram .................. 425/297 |
| 7,178,562 B2 | 2/2007 | Ritz et al. |
| 7,331,777 B2 | 2/2008 | Mattice et al. |
| 7,399,174 B2 | 7/2008 | Deardurff et al. |
| 2005/0248054 A1 | 11/2005 | Bates et al. |
| 2006/0233904 A1 * | 10/2006 | Mattice et al. .......... 425/348 R |

FOREIGN PATENT DOCUMENTS

| | | |
|---|---|---|
| WO | WO 03047834 A1 * | 6/2003 |
| WO | 2005097452 | 10/2005 |
| WO | 2006/113185 | 10/2006 |

* cited by examiner

METHOD FOR COMPRESSION MOLDING
PLASTIC ARTICLES

CROSS-REFERENCE TO RELATED APPLICATIONS

This application is a division of U.S. patent application Ser. No. 11/185,976, filed on Jul. 21, 2005, now issued as U.S. Pat. No. 7,407,376, the contents of which are incorporated by reference herein in their entirety.

FIELD OF THE INVENTION

This invention relates generally to molding plastic articles and more particularly to a compression molding apparatus and method.

BACKGROUND OF THE INVENTION

Various plastic articles, such as plastic closures and preforms for containers, have been formed by a compression molding process. Some compression molding machines have a plurality of tools mounted in a circumferential array on a rotatable turret in a plurality of opposed co-acting pairs. The tools of each pair carry opposed male and female mold sections that when closed together form a cavity in which plastic articles may be compression molded. During a portion of the rotation of the turret, the mold tooling pairs are moved toward each other for compression molding articles between the tooling pairs and away from each other for releasing articles molded between the tooling pairs and to receive fresh charges of plastic into the mold cavities. The charges of plastic may be taken and delivered from an extruded stream of plastic discharged from an extruder to provide a relatively rapidly available supply of plastic material for the molding machine.

SUMMARY OF THE INVENTION

A method for compression molding plastic articles includes the step of providing a plurality of molds mounted for travel around a first axis. Each mold includes an upper mold section and a lower mold section, with at least one of the upper and lower mold sections being moveable in a first endless path, and being moveable with respect to the other mold section to form a mold cavity. The method also includes the step of providing a mold charge delivery system for receiving mold charges from a source of plastic material and for delivering individual mold charges to the mold cavities. The mold charge delivery system includes at least one delivery mechanism that travels in a second endless path around a second axis parallel to the first axis. At least one of the mold sections is moved radially relative to the first axis during at least a portion of the first endless path. The second endless path overlies a portion of the first endless path, wherein the first endless path is non-circular. Accordingly, in one presently preferred embodiment, at least one of the upper and lower mold sections of the mold and the mold charge delivery system follow substantially the same path over at least a portion of the first endless path to facilitate transferring the individual mold charges from the mold charge delivery system to the cavities.

BRIEF DESCRIPTION OF THE DRAWINGS

These and other objects, features, advantages and aspects of the present invention will be apparent from the following detailed description of the preferred embodiments and best mode, appended claims and accompanying drawings, in which:

DETAILED DESCRIPTION OF THE PREFERRED EMBODIMENTS

Figure 1:
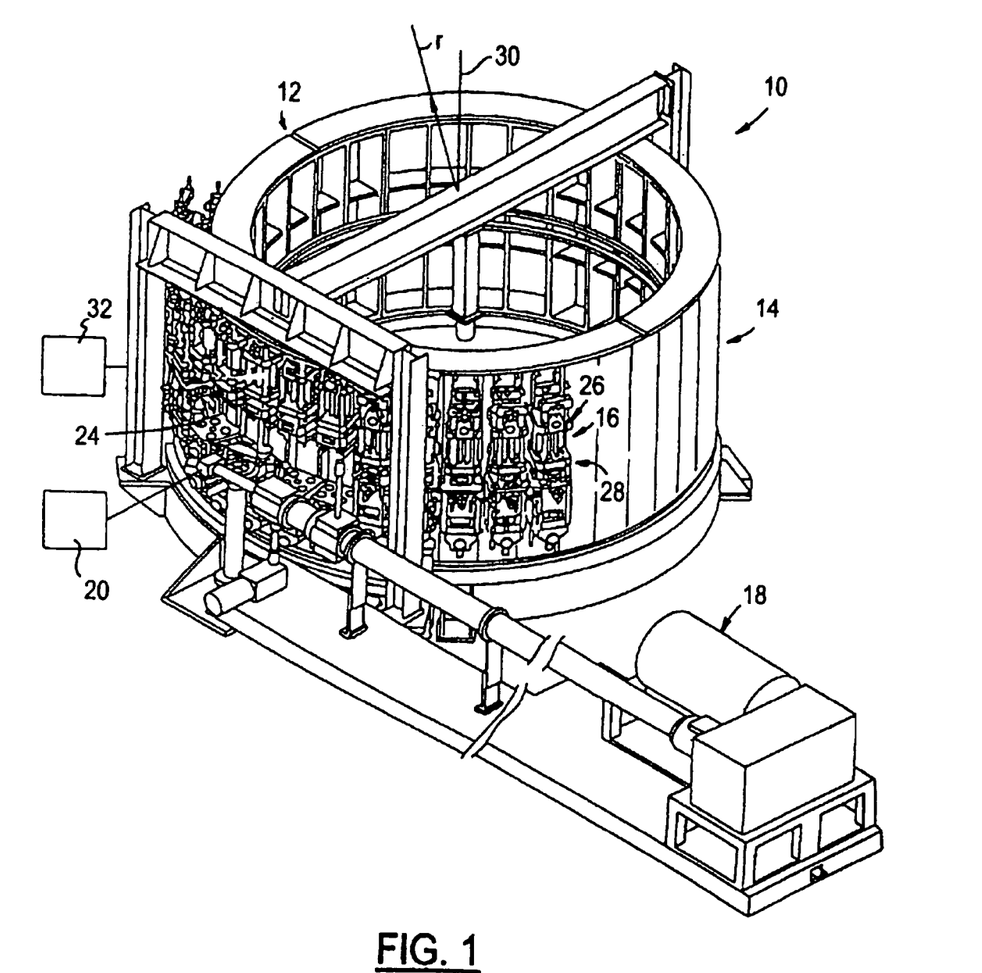
FIG. 1 is a perspective view of one presently preferred embodiment of a system for compression molding plastic articles including a plurality of molds mounted for travel around an axis according to the present invention.

Referring in more detail to the drawings, FIG. 1 illustrates an apparatus 10 for compression molding plastic articles, such as preforms that are subsequently molded into packaging components such as containers or closures, for example. The apparatus 10 includes a compression molding machine 12 that preferably includes a rotary turret 14 with a plurality of pairs of mold tooling 16. The mold tooling pairs 16 have upper and lower mold sections 26, 28 mounted about the periphery of the turret 14 (in FIG. 1, some mold tooling pairs 16 have been removed to better show the turret), with at least one of the mold sections 26, 28 traveling along a first endless path. An extruder 18 provides molten plastic material that is delivered to the mold tooling pairs 16 to form the plastic articles. The extruded plastic material is delivered to the mold tooling pairs 16 by a pellet cutter and mold charge delivery system 20 that preferably accurately cuts the extruded material into individual plastic mold charge pellets or charges 22 (FIG. 3) of a desired size and delivers the pellets or plastic charges 22 into mold cavities 24 of the mold tooling pairs 16.

The mold charge delivery system 20 includes at least one and preferably a plurality of delivery mechanisms or arms 34 (FIGS. 2 and 4) that travel in a second endless path around a second axis 36 to deliver the individual mold charges 22 received from a source of plastic material to the cavities 24 in turn. The mold charge delivery system 20 can be constructed substantially as shown and described in U.S. patent application Ser. No. 10/822,297, the disclosure of which is incorporated herein by reference in its entirety. So constructed and arranged the mold charge delivery system 20 moves the delivery mechanism or arms 34 along the second endless path that desirably overlies at least a portion of the first endless path traveled by at least one of the mold sections 26, 28. Preferably, to facilitate aligning the arms 34 with the cavities 24 of the lower mold sections 28, the second endless path and the first endless path follow substantially the same path during at least a portion of their extent.

Figure 2:
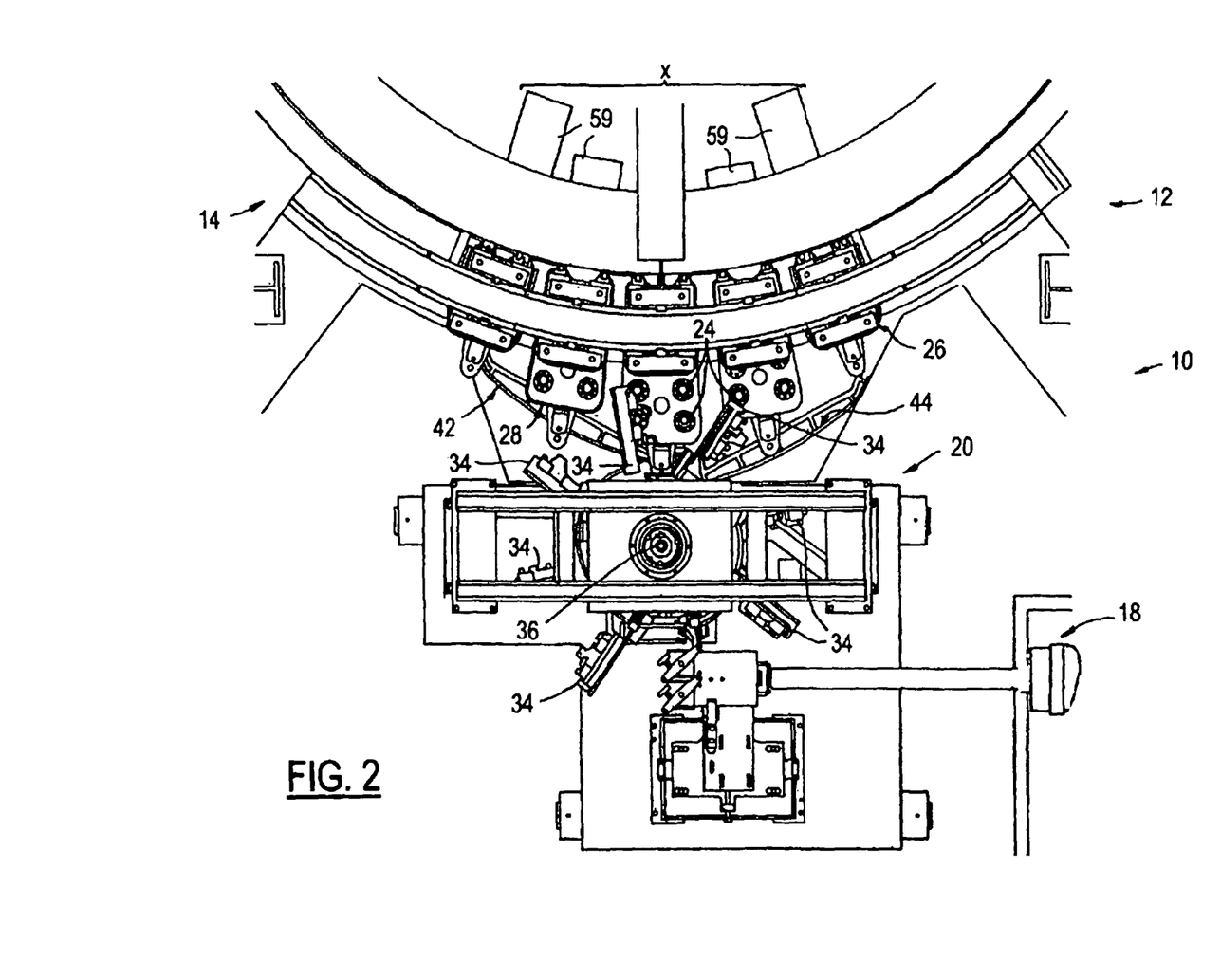
FIG. 2 is a partial plan view of the system of FIG. 1 showing a mold charge delivery system and a portion of a compression molding apparatus.
Figure 4:
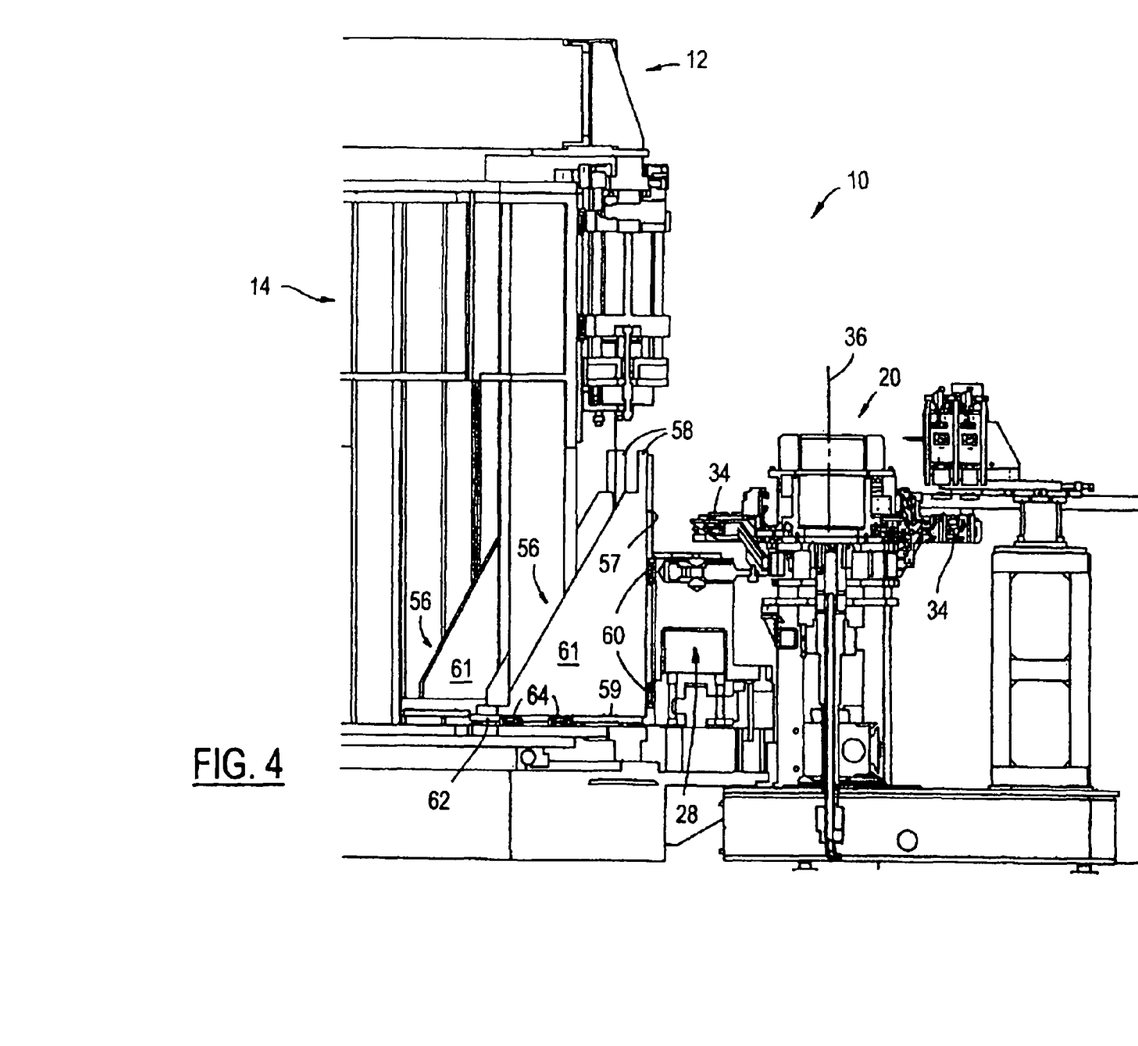
FIG. 4 is a partial elevation view of the compression molding apparatus and mold charge delivery system of FIG. 1.

Desirably, the mold tooling pairs 16 are rotated with the turret 14 around a first axis 30 that is preferably spaced from and parallel to the second axis 36. At least one of the mold sections 26, 28 is moveable with respect to the other to open and close the respective mold cavities 24. By way of example, the mold sections 26, 28 are shown here as being moveable relative to one another in a direction generally parallel to the first axis 30 to open and close the respective mold cavities 24, shown here as having four separate cavities in each of the mold tooling pairs 16. The pairs of mold tooling 16 may be constructed and arranged substantially as shown and described in U.S. patent application Ser. No. 10/822,299, issued as U.S. Pat. No. 7,399,174, the disclosure of which is incorporated herein by reference in its entirety. The rotary turret 14 and associated components can be constructed and arranged at least in part as shown and described in U.S. patent application Ser. No. 10/816,498, the disclosure of which is incorporated herein by reference in its entirety. Further, a take-out mechanism 32 is preferably provided to remove formed plastic articles from the mold cavities 24 and transfer them away from the compression molding machine 12 for further processing, such as cooling or blow molding, for example. The take-out mechanism 32 can be constructed substantially as shown and described in U.S. patent application Ser. No. 10/841,771, issued as U.S. Pat. No. 7,632,089, the disclosure of which is incorporated herein by reference in its entirety.

Desirably, the mold tooling pairs 16 are open during a portion of the rotary movement of the turret 14 to permit formed plastic articles to be removed therefrom and fresh individual mold charge pellets 22 to be delivered into the mold cavities 24. To increase the productivity and efficiency of the system, the mold tooling pairs 16 are preferably separated for a limited duration of the molding cycle. This increases the time during the cycle for compression molding and permits an increased rotary speed of the compression molding machine 12. It also defines a relatively limited area in which the mold charge delivery system 20 must deliver fresh pellets 22 into the mold cavities 24.

Figure 3:
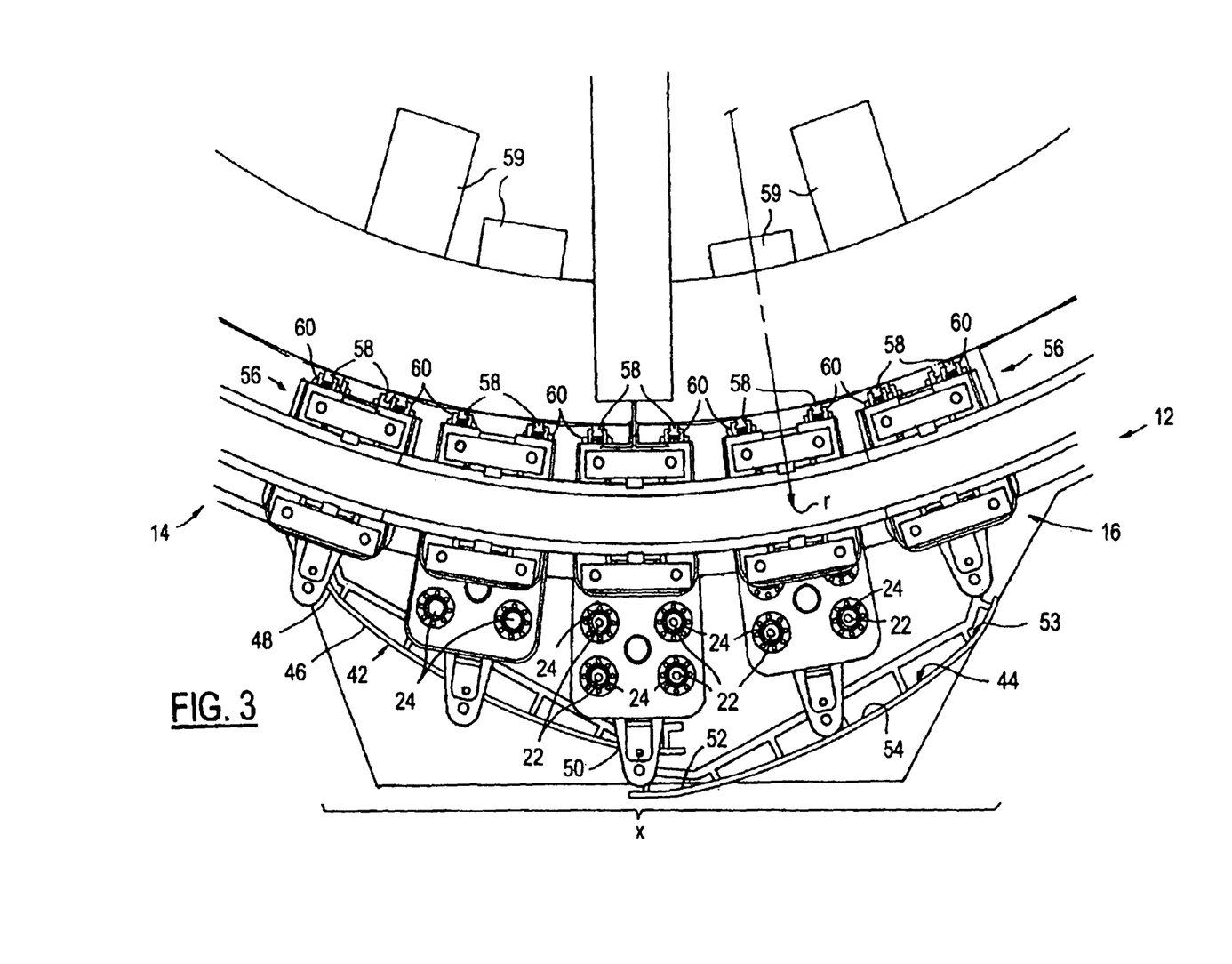
FIG. 3 is an enlarged partial plan view of the compression molding apparatus of FIG. 1 showing a pair of cam surfaces for directing the travel of lower mold sections.

As best shown in FIGS. 1 and 3, the upper mold sections 26 are shown here as being attached for travel along a generally circular path at a first radius (r) about the first axis 30. The upper mold sections 26 could be arranged to travel along an otherwise non-circular path similar to the lower mold sections 28, as is discussed in further detail hereafter.

To make more efficient and reliable the transfer of the individual mold charge pellets 22 into the respective mold cavities 24, the first endless path traveled by the lower mold sections 28 is non-circular. To facilitate the movement of the lower mold sections 28 along the first endless path, desirably the lower mold sections 28 have at least one cam follower 38 (FIG. 5) attached thereto. The cam followers 38 are each carried on a bracket that extends generally radially outwardly from its lower mold section 28. The followers 38 are preferably rotatably carried by the brackets and adapted for rolling engagement through the bearing elements 40 with at least one and shown here as a pair of cam surfaces 42, 44.

Figure 5:
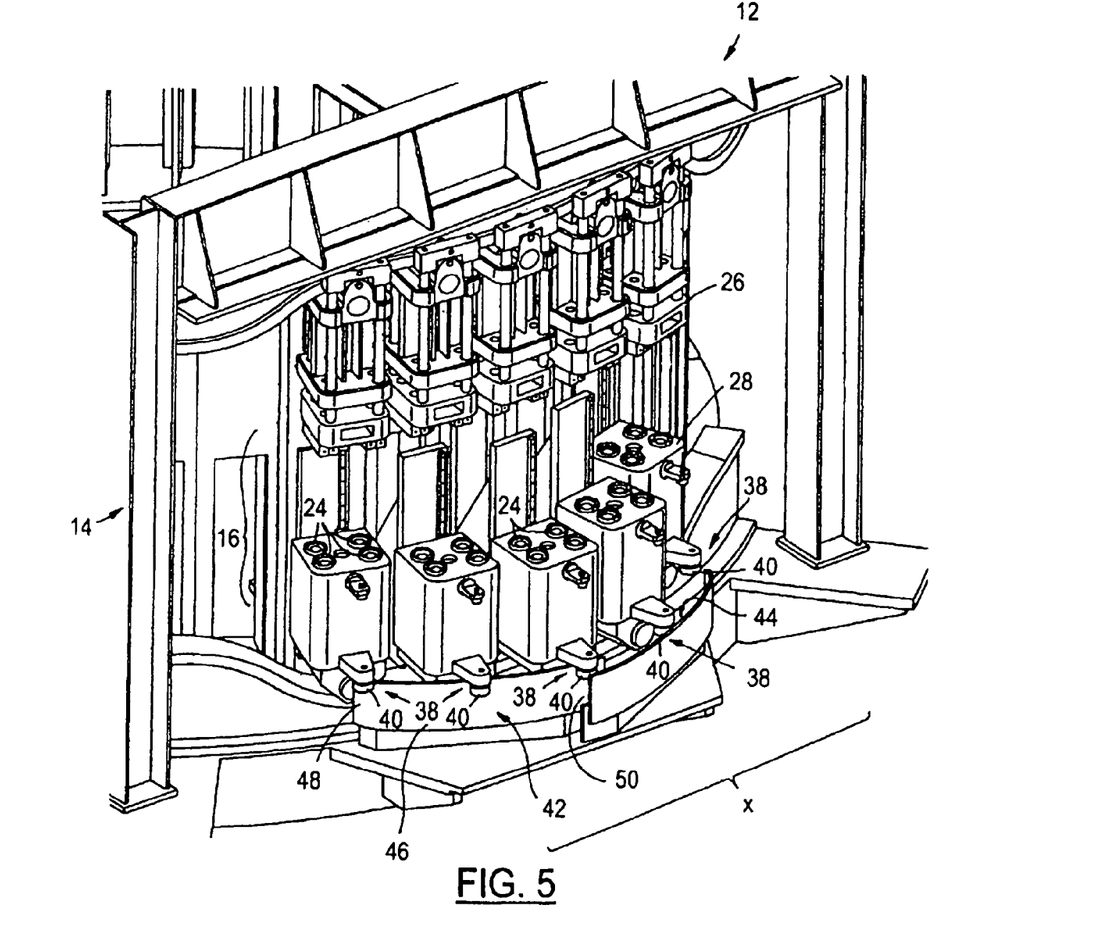
FIG. 5 is a partial perspective view of the compression molding apparatus showing some of the lower mold sections engaging the cam surfaces.

As best shown in FIGS. 3 and 5, the cam surfaces 42, 44 are located within a portion or sector (X) of the rotation of the turret 14 where the fresh mold charge pellets 22 are placed in and the molded articles are removed from the mold cavities 24. The cam surfaces 42, 44 define at least a portion of the first endless path traveled by the lower mold sections 28. Accordingly, the first endless path has a generally circular first portion having the same radius (r) about the first axis 30 as the upper mold sections 26, and also has a second portion defined by the cam surfaces 42, 44.

As best shown in FIG. 3, the cam surface 42 has a generally convex outer surface 46 extending between a lead-in cam portion 48 extending radially outwardly from the first portion of the first path in the direction of turret rotation and a cam exit portion 50 spaced radially outwardly from the radius (r) of the first path. The outer surface 46 is represented as having a generally constant radius of curvature, though it could have any desired shape to obtain the desired path of travel for the lower mold sections 28.

The cam surface 44 has a generally concave inner surface 54 extending between a lead-in cam portion 52 spaced radially outwardly from the radius (r) of the first path and a cam exit portion 53 extending radially inwardly toward the first portion of the first path in the direction of turret rotation. Desirably, the lead-in cam portion 52 of the cam surface 44 overlaps the cam exit portion 50 of the cam surface 42 to facilitate a smooth transition of the cam followers 38 of the lower mold sections 28 as they travel between the cooperating cam surfaces 42, 44. The inner surface 54 is represented as having a generally constant radius of curvature, though it could have any desired shape to obtain the desired path of travel for the lower mold sections 28 over the cam surface 44. To facilitate transferring the pellets 22 into the cavities 24, desirably the outer surface 46 and the inner surface 54 of the cam surfaces 42, 44, respectively, cooperate to direct the lower mold sections 28 over a generally linear path of travel during at least a portion of the travel along the sector (X) where the second endless path overlaps the first endless path.

As best shown in FIG. 4, each lower mold section 28 is operably supported by a separate carrier 56 for lateral movement relative to the turret 14 and axial movement toward and away from the associated upper mold section 26. The carrier 56 has an axially extending surface 57 and a radially extending surface 59 with angled supports 61 disposed between the surfaces 57, 59. To mount the lower mold sections 28 on their respective carriers 56 and permit axial movement of the lower mold sections 28 relative to the carriers 56 and the turret 14, linear bearings are provided between the lower mold sections 28 and the carriers 56. The linear bearings preferably include one or more guiderails 58 on the axial surface 57 of the carriers 56 and bearing blocks 60 carried by the lower mold sections 28 and received on the guiderails 58. Accordingly, as the lower mold sections 28 enter or approach the sector (X), the lower mold sections 28 first move axially away from the upper mold sections 26 to open the mold cavities 24, whereupon the molded articles can be removed from the cavities 24 and the new mold charge pellets 22 can be loaded into the empty cavities 24. Then as the lower mold sections 28 exit the sector (X), or shortly thereafter, the lower mold sections 28 move along the rails 58 back toward the upper mold sections 26 to close the mold cavities 24, whereupon the mold charge pellets 22 within the mold cavities 24 are compressed throughout the mold cycle to the desired mold configuration. To further facilitate opening and closing the mold cavities 24, the upper mold sections 26 preferably move upwardly and downwardly away from and toward the lower mold sections 28 in similar, but opposite fashion to the movement of the lower mold sections 28, respectively, as discussed in more detail in U.S. patent application Ser. No. 10/816,498.

To permit and control generally radial movement of the lower mold sections 28 during travel along the second portion of the first path, linear bearings are provided between the carriers 56 and the turret 14. As best shown in FIG. 4, for each carrier 56, the linear bearings preferably include one or more guiderails 62 mounted on the turret 14 and one or more bearing blocks 64 carried by the radial surface 59 of the carrier 56 and received on the guiderails 62. As such, the carriers 56 move radially outwardly along the guide rails 62 relative to the turret 14 as the cam followers 38 engage the lead-in cam portion 48 of the cam surface 42 and travel along the outer surface 46 toward the cam exit portion 50. The lower mold sections 28 move with the carriers 56, and thus, move radially outwardly from the axis 30 along the second portion of the first endless path. Desirably, as the lower mold sections 28 travel along the generally linear portion of the second portion of the first path, new mold charge pellets 22 are deposited in the lower mold cavities 24. The cam followers 38 engage the lead-in cam portion 52 and travel along the inner surface 54 radially inwardly toward the cam exit portion 53 of the cam surface 44. The lower mold sections 28 move with the carriers 56, and thus, the lower mold sections 28 move radially inwardly toward the first axis 30 along the second portion of the first endless path as controlled by engagement of the cam followers 38 with the cam surface 44. Thereafter, the carriers 56 and the upper and lower mold sections 26, 28 move about the generally circular first portion of the first endless path as the mold pellets 22 are compressed within the mold cavities 24.

It should be recognized that upon reading the disclosure herein, one ordinarily skilled in this art would readily recognize other embodiments than those disclosed herein, with those embodiments being within the scope of the claims that follow. For example, if desired, at least a portion of the movement of the lower mold sections 28 radially away from the axis 30 along the cam surface 42 may coincide with at least a portion of the movement of the upper and lower mold sections 26, 28 away from one another, and at least a portion of the movement of the lower mold sections 28 radially toward the axis 30 along the cam surface 44 may coincide with at least a portion of the movement of the upper and lower mold sections 26, 28 toward one another. Further, while in the presently preferred embodiment the portion of the first endless path wherein mold charge pellets are delivered to the cavities has been described as being linear, it could be any suitable shape such as arcuate (either concave or convex relative to the turret 14) by way of example without limitation. Accordingly, this disclosure herein is intended to be exemplary, and not limiting. The scope of the invention is defined by the following claims.

The invention claimed is:

1. A method for compression molding plastic articles, comprising the steps of:
    (a) actuating an apparatus having a plurality of molds mounted for travel around a vertical first axis along a first endless path, each of the molds including a pair of mold sections, at least one of the mold sections being moveable with respect to the other in a first direction parallel to the first axis and at least one of the mold sections having a cam follower attached directly thereto and being movable in a second direction orthogonal to the first axis;
    (b) delivering mold charges from a source to a mold charge delivery system that travels in a second endless path around a second axis parallel to the first axis, the second endless path overlying a portion of the first endless path; wherein the cam follower engages a first cam surface having a generally convex outer surface to move the at least one mold section radially outward from and orthogonal to the first axis and engages a second cam surface having a generally concave inner surface to move the at least one mold section radially inward toward and orthogonal to the first axis, and wherein the first cam surface and second cam surface are located within a portion of the first endless path where the mold charges are placed in the molds and direct the molds over a generally linear path of travel along the portion where the second endless path overlies the first endless path; and,
    (c) removing molded plastic articles from the apparatus.

2. The method of claim 1, wherein said first endless path has a generally circular first portion at a first radius around said first axis and a second portion at a different radius from said first axis than said first radius.

3. The method of claim 1, wherein at least a portion of the movement of at least one of said mold sections orthogonal to said first axis is away from said first axis and coincides with at least a portion of the movement of at least one of said mold sections parallel to said first axis which causes the mold sections to move away from one another.

4. The method of claim 1, wherein at least a portion of the movement of at least one of said mold sections orthogonal to said first axis is toward said first axis and coincides with at least a portion of the movement of at least one of said mold sections parallel to said first axis which causes the mold sections to move toward one another.

5. The method of claim 1, wherein the mold sections each include an upper mold section and a lower mold section and the upper mold sections move in a circular path over the first endless path.

6. The method of claim 5, wherein at least one of the upper and lower mold sections is operably supported on a bearing.

7. The method of claim 6 wherein the bearing is a linear bearing that extends radially relative to the first axis.

8. The method of claim 1, wherein the first endless path has a generally circular first portion at a first radius around the first axis and a second portion at a greater distance from the first axis than the first radius, the second endless path overlying at least some of the second portion of the first endless path.

9. The method of claim 8, wherein the mold sections include an upper mold section and a lower mold section and the lower mold sections move axially away from the upper mold sections while moving radially outwardly from the first axis.

10. The method of claim 8, wherein the mold sections include an upper mold section and a lower mold section and the lower mold sections move axially toward the upper mold sections while moving radially inwardly toward the first axis.

11. A method for compression molding plastic articles, comprising the steps of:
    (a) actuating an apparatus having a plurality of molds mounted for travel around a vertical first axis, each of the molds including an upper mold section being movable in a first endless path about the first axis and a lower mold section being moveable about the first axis in the first endless path and having a cam follower attached directly thereto, the upper and lower mold sections being moveable vertically with respect to each other to form a mold cavity;
    (b) delivering mold charges from a source to a mold charge delivery system that travels in a second endless path around a second axis parallel to the first axis, the second endless path overlying a portion of the first endless path; wherein the cam follower engages a first cam surface having a generally convex outer surface to move the lower mold section radially outward from and orthogonal to the first axis and engages a second cam surface having a generally concave inner surface to move the lower mold section radially inward toward and orthogonal to the first axis, and wherein the first cam surface and second cam surface are located within a portion of the first endless path where the mold charges are placed in the mold cavity and direct the lower mold sections over a generally linear path of travel along the portion where the second endless path overlies the first endless path; and
    (c) removing molded plastic articles from the apparatus.

12. The method of claim 11, wherein the first endless path has a generally circular first portion at a first radius around the first axis, the non-circular portion being at a different distance from the first axis than the first radius, the second endless path overlying at least a portion of the non-circular portion of the first endless path.

13. The method of claim 11, wherein at least one of the upper and lower mold sections is operably supported on a bearing.

14. The method of claim 13, wherein the bearing is a linear bearing that extends radially relative to the first axis.

15. The method of claim 11, wherein the lower mold sections first move axially away from the upper mold section to open the mold cavities in the portion where the second endless path overlies the first endless path, whereupon the molded articles can be removed from the mold cavities and new mold charges can be loaded into the mold cavities.

16. The method of claim 1, wherein at least one of the mold sections moves radially outwardly and radially inwardly from the first axis during at least a portion of the movement of the mold sections along the portion where the second endless path overlies the first endless path.

17. The method of claim 1, wherein one of the mold sections first moves axially away from the other mold section to open the mold in the portion where the second endless path overlies the first endless path, whereupon the molded articles can be removed from the mold and new mold charges can be loaded into the mold.

18. A method for compression molding plastic articles, comprising the steps of:
   (a) actuating an apparatus having a plurality of molds mounted for travel around a vertical first axis, each of the molds including an upper mold section being movable in a first endless path about the first axis and a lower mold section being moveable about the first axis in the first endless path and having a cam follower attached directly thereto, the upper and lower mold sections being moveable vertically with respect to each other to form a mold cavity;
   (b) delivering mold charges from a source to a mold charge delivery system that travels in a second endless path around a second axis parallel to the first axis, the second endless path overlying a portion of the first endless path; wherein the first endless path has a generally circular first portion at a first radius around the first axis and a second portion at a greater distance from the first axis than the first radius, the second endless path overlying at least some of the second portion, wherein the cam follower engages a first cam surface having a generally convex outer surface to move the lower mold section radially outward from and orthogonal to the first axis and engages a second cam surface having a generally concave inner surface to move the lower mold section radially inward toward and orthogonal to the first axis, and wherein the first cam surface and second cam surface are located within a portion of the first endless path where the mold charges are placed in the mold cavity and direct the lower mold sections over a path of travel along the second portion of the first endless path; and
   (c) removing molded plastic articles from the apparatus.

19. The method of claim 18, wherein the path of travel is generally linear.

20. The method of claim 18, wherein the path of travel is arcuate.

* * * * *